(12) United States Patent
Schechter et al.

(10) Patent No.: US 10,437,819 B2
(45) Date of Patent: Oct. 8, 2019

(54) PROCESSING QUERIES CONTAINING A UNION-TYPE OPERATION

(71) Applicant: Ab Initio Technology LLC, Lexington, MA (US)

(72) Inventors: Ian Schechter, Sharon, MA (US); Alexander Lavrentyev, Derry, NH (US)

(73) Assignee: Ab Initio Technology LLC, Lexington, MA (US)

( * ) Notice: Subject to any disclaimer, the term of this patent is extended or adjusted under 35 U.S.C. 154(b) by 251 days.

(21) Appl. No.: 14/746,188

(22) Filed: Jun. 22, 2015

(65) Prior Publication Data

US 2016/0140166 A1    May 19, 2016

Related U.S. Application Data

(60) Provisional application No. 62/079,922, filed on Nov. 14, 2014.

(51) Int. Cl.
*G06F 16/24* (2019.01)
*G06F 16/242* (2019.01)
(Continued)

(52) U.S. Cl.
CPC .............. *G06F 16/244* (2019.01); *G06F 8/30* (2013.01); *G06F 16/2452* (2019.01);
(Continued)

(58) Field of Classification Search
CPC ...................................................... G06F 16/244
(Continued)

(56) References Cited

U.S. PATENT DOCUMENTS 4,586,137 A    4/1986 Frost
5,088,034 A    2/1992 Ihara et al.
(Continued)

FOREIGN PATENT DOCUMENTS

CA    2259362    1/1998
CN    1786950    6/2006
(Continued)

OTHER PUBLICATIONS

European Office Action in Application No. 12721999.6, dated Nov. 11, 2016 (10 pages).
(Continued)

*Primary Examiner* — Syling Yen
(74) *Attorney, Agent, or Firm* — Fish & Richardson P.C.

(57) ABSTRACT

Among other things, a method of generating a computer program based on an SQL query includes receiving a SQL query, including a reference to a first data set stored at a first data source, and including a reference to a second data set stored at a second data source different from the first data source, determining that the SQL query includes two or more commands, the commands including a first union-type operation, and a first aggregation operation, and determining that the SQL query describes that the first union-type operation shall be applied to at least a portion of data from the first data set, and applied to at least a portion of data from the second data set, determining that the SQL query describes that the first aggregation operation shall be applied to data resulting from the first union-type operation, and generating the computer program.

44 Claims, 8 Drawing Sheets

(51) Int. Cl.
*G06F 16/28* (2019.01)
*G06F 16/901* (2019.01)
*G06F 16/2453* (2019.01)
*G06F 8/30* (2018.01)
*G06F 16/2452* (2019.01)

(52) U.S. Cl.
CPC ...... *G06F 16/24544* (2019.01); *G06F 16/284* (2019.01); *G06F 16/9024* (2019.01)

(58) Field of Classification Search
USPC .................................................. 707/758, 759
See application file for complete search history.

(56) References Cited

U.S. PATENT DOCUMENTS

| | | |
|---|---|---|
| 5,151,991 A | 9/1992 | Iwasawa et al. |
| 5,313,584 A | 5/1994 | Tickner et al. |
| 5,347,639 A | 9/1994 | Rechtschaffen et al. |
| 5,367,619 A | 11/1994 | Dipaolo et al. |
| 5,446,915 A | 8/1995 | Pierce |
| 5,475,842 A | 12/1995 | Gilbert et al. |
| 5,475,843 A | 12/1995 | Halviatti et al. |
| 5,546,576 A | 8/1996 | Cochrane et al. |
| 5,574,898 A | 11/1996 | Leblang et al. |
| 5,588,150 A | 12/1996 | Lin et al. |
| 5,600,833 A | 2/1997 | Senn et al. |
| 5,619,692 A | 4/1997 | Malkemus et al. |
| 5,632,022 A | 5/1997 | Warren et al. |
| 5,678,044 A | 10/1997 | Pastilha et al. |
| 5,682,537 A | 10/1997 | Davies et al. |
| 5,706,509 A | 1/1998 | Man-Hak Tso |
| 5,712,971 A | 1/1998 | Stanfill et al. |
| 5,734,886 A | 3/1998 | Grosse et al. |
| 5,752,196 A | 5/1998 | Ahvenainen et al. |
| 5,768,564 A | 6/1998 | Andrews et al. |
| 5,799,149 A | 8/1998 | Brenner et al. |
| 5,819,021 A | 10/1998 | Stanfill et al. |
| 5,870,743 A | 2/1999 | Cohen et al. |
| 5,901,353 A | 5/1999 | Pentikainen |
| 5,909,681 A | 6/1999 | Passera et al. |
| 5,930,723 A | 7/1999 | Heiskari et al. |
| 5,935,216 A | 8/1999 | Benner et al. |
| 5,956,074 A | 9/1999 | Gautam et al. |
| 5,966,072 A | 10/1999 | Stanfill et al. |
| 5,999,729 A | 12/1999 | Tabloski, Jr. et al. |
| 6,031,993 A | 2/2000 | Andrews et al. |
| 6,077,313 A | 6/2000 | Ruf |
| 6,205,465 B1 | 3/2001 | Schoeing et al. |
| 6,253,371 B1 | 6/2001 | Iwasawa et al. |
| 6,266,804 B1 | 7/2001 | Isman |
| 6,295,518 B1 | 9/2001 | McLain et al. |
| 6,311,265 B1 | 10/2001 | Beckerle et al. |
| 6,330,008 B1 | 12/2001 | Razdow et al. |
| 6,345,267 B1 | 2/2002 | Lohman et al. |
| 6,415,286 B1 | 7/2002 | Passera et al. |
| 6,453,464 B1 | 9/2002 | Sullivan |
| 6,615,203 B1 | 9/2003 | Lin et al. |
| 6,625,593 B1 | 9/2003 | Leung et al. |
| 6,694,306 B1 | 2/2004 | Nishizawa et al. |
| 6,785,668 B1 | 8/2004 | Polo et al. |
| 6,915,290 B2 | 7/2005 | Bestgen et al. |
| 7,047,232 B1 | 5/2006 | Serrano |
| 7,080,062 B1 | 7/2006 | Leung et al. |
| 7,111,019 B1 | 9/2006 | Nishizawa |
| 7,133,861 B2 | 11/2006 | Day et al. |
| 7,164,422 B1 | 1/2007 | Wholey, III et al. |
| 7,167,850 B2 | 1/2007 | Stanfill |
| 7,249,120 B2 | 7/2007 | Bruno et al. |
| 7,359,922 B2 | 4/2008 | Young-Lai et al. |
| 7,428,532 B2 | 9/2008 | Styles |
| 7,464,084 B2 | 12/2008 | Huang et al. |
| 7,584,205 B2 | 9/2009 | Stanfill et al. |
| 7,664,730 B2 | 2/2010 | Ziauddin et al. |
| 7,856,462 B2 | 12/2010 | Huang et al. |
| 7,945,562 B2 | 5/2011 | Ahmed et al. |
| 7,953,891 B2 | 5/2011 | Blaszczak et al. |
| 8,122,088 B2 | 2/2012 | Banatwala |
| 8,204,903 B2 | 6/2012 | Bowers |
| 8,412,746 B2 | 4/2013 | Fox et al. |
| 8,538,985 B2 | 9/2013 | Betawadkar-Norwood et al. |
| 8,666,966 B2 | 3/2014 | Ranganathan |
| 8,688,683 B2 | 4/2014 | Simon |
| 8,782,081 B2 | 7/2014 | Guan |
| 8,850,574 B1 | 9/2014 | Ansel |
| 8,875,145 B2 | 10/2014 | Atterbury et al. |
| 9,128,983 B2 | 9/2015 | Cheng |
| 9,177,022 B2 | 11/2015 | Taranov |
| 9,317,551 B1 | 4/2016 | Zander |
| 9,477,778 B2 | 10/2016 | Hammerschmidt |
| 2001/0011371 A1 | 8/2001 | Tang |
| 2003/0041052 A1 | 2/2003 | Gajda |
| 2003/0093410 A1 | 5/2003 | Couch et al. |
| 2003/0120682 A1 | 6/2003 | Bestgen et al. |
| 2005/0038788 A1 | 2/2005 | Styles |
| 2005/0108209 A1 | 5/2005 | Beyer et al. |
| 2005/0278152 A1 | 12/2005 | Blaszczak |
| 2006/0095466 A1 | 5/2006 | Stevens et al. |
| 2006/0265362 A1 | 11/2006 | Bradford |
| 2006/0294150 A1 | 12/2006 | Stanfill et al. |
| 2007/0067274 A1 | 3/2007 | Han et al. |
| 2007/0186036 A1 | 8/2007 | Bittner |
| 2007/0271381 A1 | 11/2007 | Wholey et al. |
| 2008/0049022 A1 | 2/2008 | Sherb et al. |
| 2008/0052299 A1 | 2/2008 | Shinke et al. |
| 2008/0151749 A1 | 6/2008 | Kawamura |
| 2008/0256014 A1 | 10/2008 | Gould et al. |
| 2008/0270646 A1 | 10/2008 | Wong |
| 2009/0055370 A1 | 2/2009 | Dagum et al. |
| 2009/0083313 A1 | 3/2009 | Stanfill et al. |
| 2009/0125887 A1 | 5/2009 | Kahlon et al. |
| 2009/0132474 A1 | 5/2009 | Ma |
| 2009/0222404 A1 | 9/2009 | Dolin et al. |
| 2009/0225082 A1 | 9/2009 | Hargrove et al. |
| 2009/0254774 A1 | 10/2009 | Chamdani et al. |
| 2010/0005077 A1 | 1/2010 | Krishnamurthy et al. |
| 2010/0057695 A1 | 3/2010 | Kirovski |
| 2010/0121868 A1 | 5/2010 | Biannic |
| 2010/0211953 A1 | 8/2010 | Wakeling et al. |
| 2010/0295833 A1 | 11/2010 | Nishio |
| 2011/0010358 A1 | 1/2011 | Zane |
| 2011/0029571 A1 | 2/2011 | Aggarwal et al. |
| 2011/0072319 A1 | 3/2011 | Agarwal et al. |
| 2011/0131199 A1 | 6/2011 | Simon |
| 2011/0179014 A1 | 7/2011 | Schechter et al. |
| 2011/0179404 A1* | 7/2011 | Allen ................ G06F 17/30427 717/143 |
| 2011/0208690 A1* | 8/2011 | Cushing ............ G06F 17/30592 707/602 |
| 2011/0246448 A1 | 10/2011 | Tatemura et al. |
| 2011/0276789 A1 | 11/2011 | Chambers et al. |
| 2012/0054173 A1 | 3/2012 | Andrade |
| 2012/0095987 A1 | 4/2012 | Cheng |
| 2012/0246158 A1 | 9/2012 | Ke et al. |
| 2012/0290620 A1 | 11/2012 | Guan |
| 2013/0246864 A1 | 9/2013 | Ananthapadmanabh et al. |
| 2014/0019949 A1 | 1/2014 | Craymer |
| 2014/0032617 A1 | 1/2014 | Stanfill |
| 2014/0280037 A1 | 9/2014 | Petride et al. |
| 2014/0330827 A1* | 11/2014 | Wu ................... G06F 17/30598 707/737 |

FOREIGN PATENT DOCUMENTS

| | | |
|---|---|---|
| CN | 1790324 | 6/2006 |
| EP | 0421408 | 4/1991 |
| EP | 2110761 | 10/2009 |
| EP | 2251785 | 11/2010 |
| FI | 944887 | 7/1997 |
| FI | 945495 | 9/1997 |
| FI | 951270 | 10/1997 |
| JP | 3-126169 | 5/1991 |
| JP | 8-16429 | 1/1996 |
| JP | 10-232875 | 9/1998 |

(56) References Cited

FOREIGN PATENT DOCUMENTS

| | | |
|---|---|---|
| JP | 10-340276 | 12/1998 |
| JP | 11-514116 | 11/1999 |
| JP | 2000148699 | 5/2000 |
| JP | 2001-273327 | 5/2001 |
| JP | 2003-505766 | 2/2003 |
| JP | 2003-099441 | 4/2003 |
| JP | 2006-236360 | 9/2006 |
| JP | 2009-181577 | 8/2009 |
| WO | 97/23826 | 7/1997 |

OTHER PUBLICATIONS

Garcia-Molina et al., "Database Systems the Complete Book Second Edition—Chapter 16—The Query Compiler," Pearson Prentice Hall, XP055315926, Jun. 15, 2008.
Ozsu et al., "Principles of Distributed Database Systems—Chapter 9—Multidatabase Query Processing", Principles of Distributed Database Systems: Third Edition, Springer New York, NY XP055267246, Mar. 2, 2011.
Japanese Office Action (English Translation) in Application No. 2014-509333, dated Mar. 24, 2016 (9 pages).
International Search Report & Written Opinion, Patent Cooperation Treaty, issued in PCT application No. PCT/US2011/021260, dated Apr. 18, 2011, 12 pages.
International Preliminary Report on Patentability, PCT/US2011/021260, dated May 24, 2012.
International Search Report & Written Opinion, PCT/US2012/035762, dated Feb. 19, 2013, 14 pages.
Japanese Office Action, with English translation, JP Application No. 2012-549105, dated Apr. 22, 2014, 9 pages.
Japanese Office Action, with English translation, JP 2012-549105, dated Mar. 25, 2015.
Josifovski, Vanja, et al., "Optimizing Queries in Distributed and Composable Mediators." Cooperative Information Systems, 1999. COOPIS '99 Proceedings, 1999 I FCIS International Conference in Ediburgh, UK Sep. 2-4, 1999. Sep. 2, 1999, pp. 291-302.
Levy et al., "Querying Heterogeneous Information Sources Using Source Descriptions", Proceedings of the $22^{nd}$ VLDB Conference, Mumbai (Bombay), India, pp. 251-262, 1996.
Li et al., "Load Balancing Problems for Multiclass Jobs in Distributed/Parellel Computer Systems", IEEE, vol. 47, No. 3, pp. 322-332, (Mar. 1998).
Mackert et al., "R* Optimizer Validation and Performance Evaluation for Distributed Queries", Proceedings of the Twelfth International Conference on Very Large Data Bases, Kyoto, pp. 149-159, Aug. 1986.
Notice of Reasons for Rejection issued in Japanese Application No. 2000-594025, dated Mar. 29, 2005, 3 pages.
"Relational algebra", http/en.wikipedia.org/wiki/Relational_algebra, Feb. 5, 2010.
Rim et al., "An Efficient Dynamic Load Balancing Using the Dimension Exchange Method for Balancing Quantized Loads on Hypercube Multiprocessors", IEEE, pp. 708-712 (1999).
Selinger et al., "Access Path Selection in a Relational Database Management System", ACM, pp. 23-34, 1979.
Seshadri, Sangeetha, et al., "Optimizing Multiple Queries in Distributed Data Stream Systems." Proceedings of the $22^{nd}$ International Conference on Data Engineering Workshops (ICDEW '06), Apr. 3, 2006, 6 pages.
Stanfill, Craig, "Massively Parallel Information Retrieval for Wide Area Information Servers", IEEE, pp. 679-682 (1991).
Stanfill, Craig, "The Marriage of Parallel Computing and Information Retrieval", IEEE, (2003).
Tjan, Bosco S., et al., "A Data-Flow Graphical User Interface for Querying a Scientific Database," 12602 Proceedings 1993 Symposium on Visual Languages, Aug. 24-27, 1993, 6 pages.
Torrent Technical White Paper, "Orchestrator for the SAS System—Delivering Scalability and Performance to SAS Applications," pp. 1-30.
Adamos, Panayiotis, et al., "Architectural Principles of the 'Streamonas' Data Stream Management System and Performance Evaluation based on the Linear Road Benchmark." 2008 International Conference on Computer Science and Software Engineering, Dec. 12, 2008, pp. 643-646.
Afrati et al., "Performance Considerations on a Random Graph Model for Parellel Processing", Informatique Theorique et Applications, vol. 27, No. 4, pp. 367-388, (1993).
Aho et al., "Universality of Data Retrieval Languages", ACM, pp. 110-120. 1979.
Apers et al., "PRISMA/DB: A Parallel, Main Memory Relational DBMS", IEEE, pp. 541-554 (1992).
Bodin, Francois et al., "A User Level Program Transformation Tool," ACM 1998, pp. 180-187.
Boral et al., "Prototyping Bubba: A Highly Parallel Database System", IEEE, vol. 2, No. 1 pp. 4-24, (Mar. 1990).
Braun, Peter, "Parallel Program Debugging Using Scalable Visualization",IEEE, pp. 699-708 (1995).
Cimitile et al., "Incremental migration strategies: Data flow analysis for wrapping," IEEE Comput. Soc. US., pp. 59-68, Oct. 12, 1998, XP10309754.
Canadian Office Action issued in application No. 2,2360,286, dated Jul. 27, 2005, 3 pages.
Chamberlin et al., "A History of Evaluation of System R", Communications of the ACM, vol. 24, No. 10, pp. 632-646, Oct. 1981.
Chinese Office Action issued in application No. 201180014176.7, dated Jan. 7, 2015 (English translation).
DeWitt et al., "Parallel Database Systems: The Future of High Performance Database Systems", Communications of the ACM, vol. 35, No. 6, pp. 85-98, Jun. 1992.
DeWitt et al., "The Gamma Database Machine Project", IEEE, vol. 2, No. 1, pp. 44-62, (Mar. 1990).
Flat File Database http://en.wikipedia.org/w/index.php?title+Flat_file_database&oldid_336589178 as of Jan. 8, 2010.
Forrester Research's Ellen Carney Names Compact Solutions Among "Hot Insurance Tech Companies-2009", Jun. 29, 2009.
Graefe, "Encapsulation of Parallelism in the Volcano Query Processing System", ACM, pp. 102-111, 1990.
Graefe et al., "Encapsulation of Parallelism and Architecture Independence in Extensible Database Query Execution", IEEE, vol. 19, No. 8, pp. 749-764 (Aug. 1993).
Graefe, Goetze "Volcano—An Extensible and Parallel Query Evaluation System", IEEE, vol. 6, No. 1, pp. 120-135 (Feb. 1994).
Cimitile et al., "Incremental migration strategies: Data flow analysis for wrapping," IEEE Comput. Soc. US., pp. 59-68 (1998) XP10309754.
International Search Report & Written Opinion, Patent Cooperation Treaty, issued in PCT application No. PCT/US2000/00934, dated Jan. 4, 2011, 5 pages.
Transaction History, U.S. Appl. No. 09/229,849, filed Mar. 25, 2016 (3 pages).
Transaction History, U.S. Appl. No. 13/098,823, filed Mar. 25, 2016 (4 pages).
Transaction History, U.S. Appl. No. 14/563,066, filed Mar. 25, 2016 (1 page).
Transaction History, U.S. Appl. No. 14/628,643, filed Mar. 25, 2016 (1 page).
Transaction History, U.S. Appl. No. 12/688,316, filed Mar. 25, 2016 (3 pages).
International Preliminary Report on Patentability issued in PCT/US2016/018028, dated Aug. 22, 2017.
Summons to Attend Oral Proceedings issued in European Application No. 11702533.8, dated Nov. 5, 2018.
"Variable (programming)," Wikipedia, XP05551470, Jun. 26, 2009 (retrieved from internet Oct. 12, 2018).
Zawodny, "High Performance MySQL", XP055514964, Dec. 31, 2008 (retrieved from internet Oct. 12, 2018).
Japanese Office Action in Japanese Application No. 2016-167897, dated Jun. 16, 2017, 4 pages (English Translation).
U.S. Appl. No. 09/229,849, filed Jan. 13, 1999, U.S. Pat. No. 7,047,232, Parallelizing Applications of Script-Driven Tools.
U.S. Appl. No. 12/688,316, filed Jan. 15, 2010, Managing Data Queries.

(56) References Cited

OTHER PUBLICATIONS

U.S. Appl. No. 13/098,823, filed May 2, 2011, U.S. Pat. No. 9,116,955, Managing Data Queries.
U.S. Appl. No. 14/628,643, filed Feb. 23, 2015, Managing Data Queries.
U.S. Appl. No. 14/563,066, filed Dec. 8, 2014, Source Code Translation.
U.S. Appl. No. 14/752,094, filed Jun. 26, 2015, Querying a Data Source on a Network.

* cited by examiner

PROCESSING QUERIES CONTAINING A UNION-TYPE OPERATION

CLAIM OF PRIORITY

This application claims priority to U.S. Patent Application Ser. No. 62/079,922, filed on Nov. 14, 2014, the entire contents of which are hereby incorporated by reference.

BACKGROUND

This description relates to processing queries containing a union-type operation.

A query to a data source specifies data to be retrieved from the data source. The query can be provided to the data source (e.g., a database) and a data processing system associated with the data source (e.g., a database management system) can return the data specified by the query. Various techniques can be used to parse the query to identify the data in the data source specified by the query.

SUMMARY

Aspect 1 is a method of generating a computer program based on an SQL query, including receiving a SQL query, including a reference to a first data set stored at a first data source, and including a reference to a second data set stored at a second data source different from the first data source; determining that the SQL query includes two or more commands, the commands including a first union-type operation, and a first aggregation operation, and determining that the SQL query describes that the first union-type operation shall be applied to at least a portion of data from the first data set, and applied to at least a portion of data from the second data set; determining that the SQL query describes that the first aggregation operation shall be applied to data resulting from the first union-type operation; generating a computer program on a first system based on the SQL query, the computer program configured for: transmitting instructions that direct a second system to perform a second aggregation operation on a portion of data from the first data set; receiving, from the second system, a particular data set that is a summary of the first portion of data; and performing a second union-type operation on the particular data set and a summary of a portion of data from the second data set.

Aspect 2 is the method of aspect 1, in which the computer program is further configured for: transmitting instructions that direct a third system to perform a second aggregation operation on a portion of data from the second data set; and receiving, from the third system, a particular data set that is the summary of the second portion of data.

Aspect 3 is the method of aspect 1 or 2, in which the computer program includes a first component representing the union-type operation of the SQL query that is applied to the data sets that are summaries of the first portion of data and a summary of the second portion of data, where the summaries each contain fewer records than their respective corresponding portions of data, and a second component representing the first data set, where the second component, when executed, causes the instructions to be transmitted.

Aspect 4 is the method of aspect 3, including a third component representing the second data set, and a fourth component representing a third aggregation operation, where output of the third component flows to the fourth component, and output of the fourth component flows to the first component.

Aspect 5 is the method of aspect 3 or 4, in which the output of the second component includes the particular data set that is the summary of the first portion of data.

Aspect 6 is the method of aspect 3, 4, or 5 in which the component representing the first data source transmits the instructions, wherein the instructions are carried out before the first system causes data to be transmitted to a system executing the computer program.

Aspect 7 is the method of any of aspects 1 through 6 in which the instructions include a SQL statement that includes a command corresponding to the second aggregation operation.

Aspect 8 is the method of any of aspects 1 through 7 in which generating the computer program based on the SQL query includes generating a query plan based on the SQL query; adding, to the query plan, the second aggregation operation that is applied to data from the first data source; determining that the first system includes functionality for carrying out the second aggregation operation; appending, to a portion of the query plan representing the first data set, instructions to carry out the second aggregation operation; and generating the computer program based on the query plan.

Aspect 9 is the method of any of aspects 1 through 8 in which the first aggregation operation is a minimum, maximum, sum, or count operation, and the second aggregation operation is of the same type of aggregation operation as the first aggregation operation.

Aspect 10 is the method of any of aspects 1 through 9 in which the first aggregation operation is an average operation, and the second aggregation operation is a sum operation or a count operation.

Aspect 11 is the method of any of aspects 1 through 10 including determining the second aggregation operation based on first aggregation operation.

Aspect 12 is the method of aspect 11 in which determining the second aggregation operation based on first aggregation operation includes determining a sequence of operations that, when carried out, produces output equivalent to output of the first aggregation operation, and selecting the second aggregation operation from the sequence of operations.

Aspect 13 is the method of any of aspects 1 through 12 in which the first union-type operation is of the same type to the second union-type operation.

Aspect 14 is the method of any of aspects 1 through 13 the first system includes a graph-based processing system, and the second system includes a relational database management system.

One or more of the aspects, alone or in combination, may be represented as a system, or an apparatus, or as a computer readable storage device storing a computer program product including machine readable instructions that, when executed by a computer system, carry out operations of the aspect. As one example, a computer readable storage device can store a computer program product including machine readable instructions that, when executed by a computer system, carry out operations according to any one of the first through thirteenth aspects. As another example, a computer system including one or more processors can include a computer-readable storage device storing a computer program product that includes machine readable instructions that, when executed by the one or more processors, carry out operations according to any one of the first through thirteenth aspects.

Aspects can include one or more of the following advantages. A data processing system push down aggregation operations to reduce the amount of data transferred from data sources. A computer program corresponding to a query can be simplified, for example, by removing components.

Other features and advantages of the invention will become apparent from the following description, and from the claims.

DESCRIPTION

Figure 1:
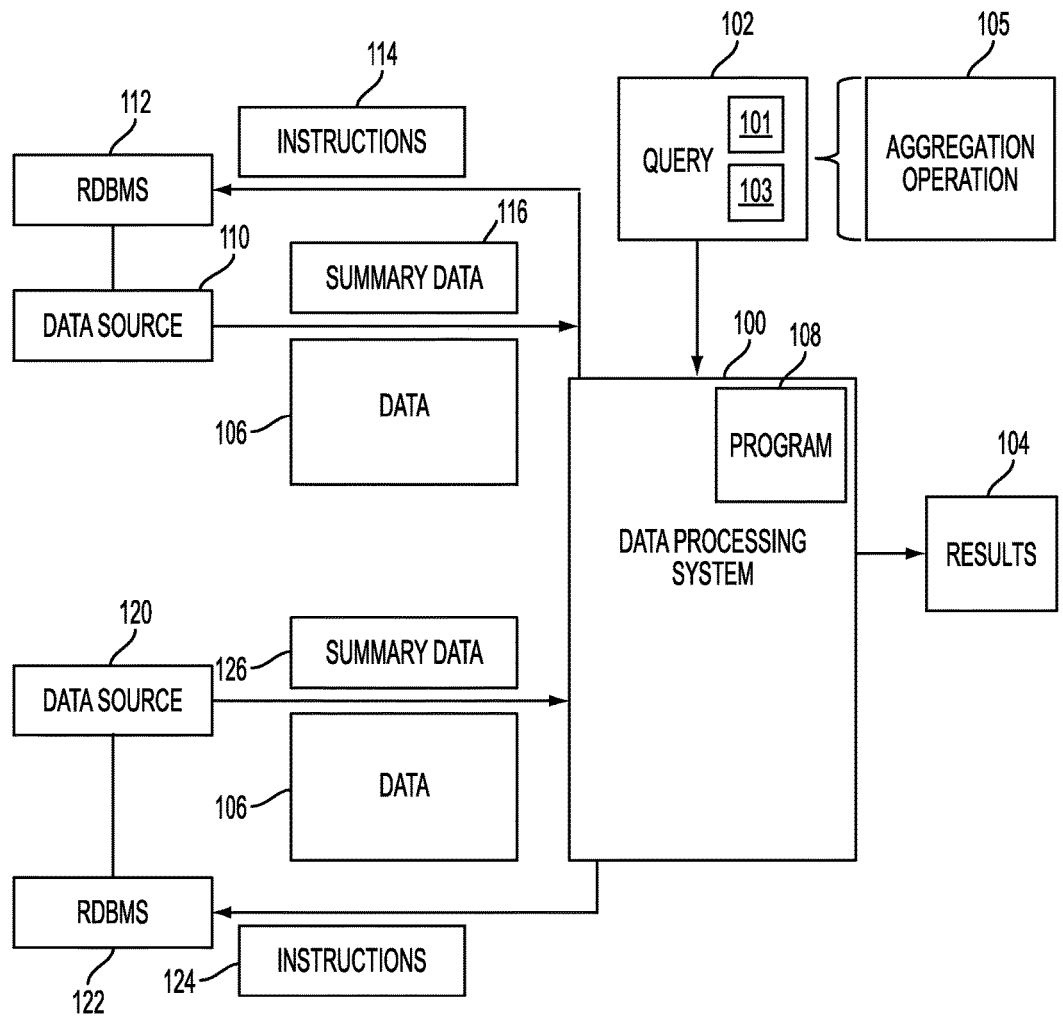
FIG. 1 shows a data processing system that can process a query.

A data processing system can convert a query (such as an SQL query) into a computer program such as a dataflow graph. The dataflow graph includes components which, when executed, carry out operations (e.g., data processing operations) equivalent to operations of the query. A system that generates the computer program from the query can determine that some operations can be performed by the data source (e.g., a database system). For example, a component of the computer program can be "pushed down" to the data source by instructing the data source to perform one or more operations represented by the component, upon which the component can be eliminated from the computer program. For example, the computer program can instruct the data source to perform the operations by transmitting a SQL statement to the data source which, when executed at the data source, carries out the operations.

A SQL query (also referred to as SQL statements) use commands and syntax defined by the structured query language (SQL). In general, a query is a statement that specifies a subset of data in one or more datasets that are indicated in the query. The specified subset can be returned by a system that processes the query to the system that issued the query. The data specified by the query and returned in response to the query is generally a portion of the total data stored in the dataset indicated by the query. An example of an SQL query could be "SELECT last_name FROM current_customers." This SQL query includes an operation, SELECT, which instructs a system executing the query to retrieve data according to the arguments of the SELECT operation. In the syntax of SQL, the arguments are "current_customers," which is a set of data such as a database table, and "last_name," which is a column of the database table. When a system interprets the query and executes the operations of the query, the system will return the data of the last_name column (e.g., each portion of data contained in the last_name column) in response to the query. SQL is described in detail in "SQL Bible, $2^{nd}$ Edition" by Alex Kriegel and Boris Trukhnov, published Apr. 7, 2008, ISBN 978-0470229064, hereby incorporated by reference.

Sometimes the query can include operations performed on a combination of records from two or more data sources. For example, the query may include a union-type operation. A union-type operation generates a set of data that includes records from two or more data sources and provides the set of data as output. Put another way, a union-type operation combines data from two or more sources into a single set of data. The term "union" (e.g., the UNION command in SQL) typically refers to a union-type operation that removes data elements duplicated in both sources of data before providing its output, while "union all" (e.g., the UNION ALL command in SQL) typically refers to a union-type operation that data elements duplicated in both sources of data before providing its output. For example, if two data sets each contain telephone numbers and both sets of data contain an element of data representing the telephone number "555-1212" then the "union" operation will output only one element of data representing the telephone number "555-1212" while the "union all" operation will output two elements of data representing the telephone number "555-1212."

The query may also include an aggregation operation (e.g., an operation such as SUM, COUNT, AVG, MIN, or MAX) after the union-type operation. An aggregation operation, which is sometimes called an aggregation function or a summarization operation, provides output data summarizing input data, such that the output data is typically much smaller in size than the input data. If the query includes an aggregation operation after the union-type operation, the system that generates the computer program can place an aggregation operation before the union-type operation, since only a summary of the data received from the data sources is needed to carry out the aggregation operation. Further, the aggregation operations placed before the union-type operation can be pushed down into their respective associated data sources if any or all of the data sources have been determined to natively support the aggregation operation. This typically reduces the amount of data transferred from the data sources, since the computer program only receives a summary of the data that would otherwise be received from some or all of the data sources.

As a real world example, a telephone corporation may store records of telephone calls that go back for 60 days. The company may have a data store containing the last 7 days of telephone records, and another data store containing the remaining 53 days of records. A query performed on all 60 days of records may include a union-type operation, and an aggregation operation can be pushed down to one or both of the data stores. Further, the data store containing the last 7 days of telephone records could be a relational database, and the data store containing the remaining 53 days of records could be a type of data store other than a relational database, for example, a flat file. An aggregation operation could still be pushed down to the relational database containing the last 7 days of telephone records.

FIG. 1 shows a data processing system 100 that can process a query 102 to generate results 104 specified by the query 102. The results 104 are based on data 106 received from data sources 110, 120 that are referenced by the query 102. The data processing system 100 receives the data 106 in response to instructions 114, 124 that the data processing system 100 generates based on the query 102.

A query 102 is used to retrieve data determined to be specified by the query.

One type of query 102 is a structured query language (SQL) query. SQL queries (also referred to as SQL statements) use commands and syntax defined by the structured query language. A typical example of a resource that returns data in response to a query is a relational database. A relational database is a collection of one or more database tables and a system that manages data processing operations such as interpreting SQL queries, reading data from the tables, writing data to the tables, and performing other kinds of data processing functions. A database table is a collection of data arranged in a) rows each representing a record and b) columns each representing a category of data stored in the rows. For example, a database table called "current_customers" may have rows each representing a current customer of a business and may have columns representing categories of data such as name of the customer, address of the customer, last product purchased by the customer, and so on.

The data sources 110, 120 are external to the data processing system 100. By external to the data processing system 100, we mean that the resource is not one of the components of the data processing system 100. (Some components of the data processing system 100 are shown in detail in FIG. 2). For example, the data sources 110, 120 could be facilities that communicate using a network (e.g., the Internet). The data processing system 100 communicates with the data sources 110, 120 by sending data to, and receiving data from, a network.

As shown in the figure, the data processing system 100 can receive a query 102 that includes references 101, 103 to multiple data sources 110, 120. The data sources 110, 120 each contain one or more sets of data. For example, the data sources 110, 120 could include sets of data such as database tables, data files, or other data structures stored on storage media, e.g., tangible, non-transitory computer-readable media.

Further, a data source is typically managed by a system associated with the data source. For example, if the data source is a relational database containing a database table (or a collection of database tables), the relational database may be managed by a relational database management system (RDBMS). The references 101, 103 can be any information that identifies a data source. In some examples, the references 101, 103 are alphanumeric "names" of the data sources 110, 120.

A relational database management system (RDBMS) is a system that processes instructions directed to creating and modifying data stored in the relational database. An RDBMS includes functionality for interpreting a query and returning data specified by the query. The combination of interpreting a query and returning data specified by the query is sometimes referred to as executing the query. For example, some RDBMS implementations include an engine which a) parses a SQL query, b) identifies operations that are defined by the structured query language, c) identifies arguments of the commands, and d) carries out (e.g., executes) the operations according to the arguments.

As described above, the SQL query "SELECT last_name FROM current_customers, includes an operation, SELECT, which instructs an RDBMS to retrieve data according to the arguments of the SELECT operation. The arguments are "current_customers," which is a database table managed by the RDBMS, and "last_name," which is a column of the database table. When the RDBMS interprets the query and executes the operations of the query, the RDBMS will return the data of the last_name column (e.g., each portion of data contained in the last_name column) in response to the query.

The data processing system 100 generates a computer program 108 (sometimes referred to as a data processing program) based on the query 102. For example, the computer program 108 can be generated using an engine (e.g., an engine that forms a subsystem of the data processing system 100) that takes a query as input and produces a dataflow graph as output. Although a dataflow graph is used as an example here, the computer program can be any kind of program that includes program code that can be executed to carry out instructions represented by the program code.

In this way, a computer program such as the computer program 108 shown in FIG. 1 can, when executed, produce the same output as the execution of the corresponding query 102, e.g., by a database management system such as an RDBMS. Thus, a query 102 can be written using a query language such as SQL. However, the systems, e.g., subsystems of the data processing system 100, carrying out the corresponding data processing operations can execute the computer program 108 in order to perform operations that are equivalent to operations that would be performed by a system (e.g., an RDBMS) that executed the query 102 but did not execute the computer program 108. When we say that two operations are equivalent, we mean that the two operations produce substantially the same output data when provided with the same input data. As an example, two operations may produce exactly the same output data when provided with the same input data. As an example, two operations provided with the same input data may produce output data that only differs in data formatting, e.g., one operation may produce comma-delimited output data, and an equivalent operation may produce tab-delimited output data that is otherwise identical to the comma-delimited output data.

In some examples, some of the operations of the query 102 can be carried out by the computer program 108 and some of the operations of the query 102 can be pushed down to the data sources 110, 120. By this we mean that the data processing system 100 identifies operations in the query 102 that can be performed by one or more of the systems 112, 122 managing the data sources 110, 120. The data processing system 100 can then generate instructions 114, 124 that, when executed by the systems 112, 122, cause the systems 112, 122 to perform operations equivalent to the operations identified by the data processing system 100. The computer program 108 can be configured to transmit the instructions 114, 124 to the systems 112, 122 when the computer program 108 is executed. The instructions 114, 124 can be instructions in any format that can be executed by the systems 112, 122.

In some examples, the respective capabilities of the data sources 110, 120 are known to the data processing system 100 based on known characteristics of the data sources 110, 120. For example, if the data processing system 100 communicates with one of the data sources 110 using SQL statements, then it is already known to the data processing system 100 that the data source 110 is capable of processing SQL statements. With this information, the data processing system 100 can identify other operations that can be represented as SQL statements and thus be pushed down to the data source 110.

In some examples, the operation that is pushed down is an aggregation operation 105. Because an aggregation operation 105 takes in data and produces a summary of the data, an aggregation operation 105 typically produces a small amount of output data relative to its input data. For this reason, it is generally more efficient for an operation corresponding to the aggregation operation 105 to be carried out by the systems 112, 122 managing the data sources 110, 120. In this way, the data processing system 100 only receives summary data 116, 126 from each of the data sources 110, 120. The summary data 116, 126 is typically a smaller quantity of data than the data 106 that would be transferred from the data sources 110, 120 if an operation corresponding to the aggregation operation 105 were performed by the computer program 108 executing on the data processing system 100. Further, an aggregation operation can generally be represented as a SQL statement or a portion of a SQL statement, and so it is an example of an operation that can be pushed down to a system capable of processing SQL statements (e.g., an RDBMS). In this way, the data 106 returned from each data source 110, 120 is a summary of a portion of data stored in the respective data source, rather than the portion of data (e.g., a portion of a database table or portion of other body of data as specified by the query 102) itself.

Figure 3:
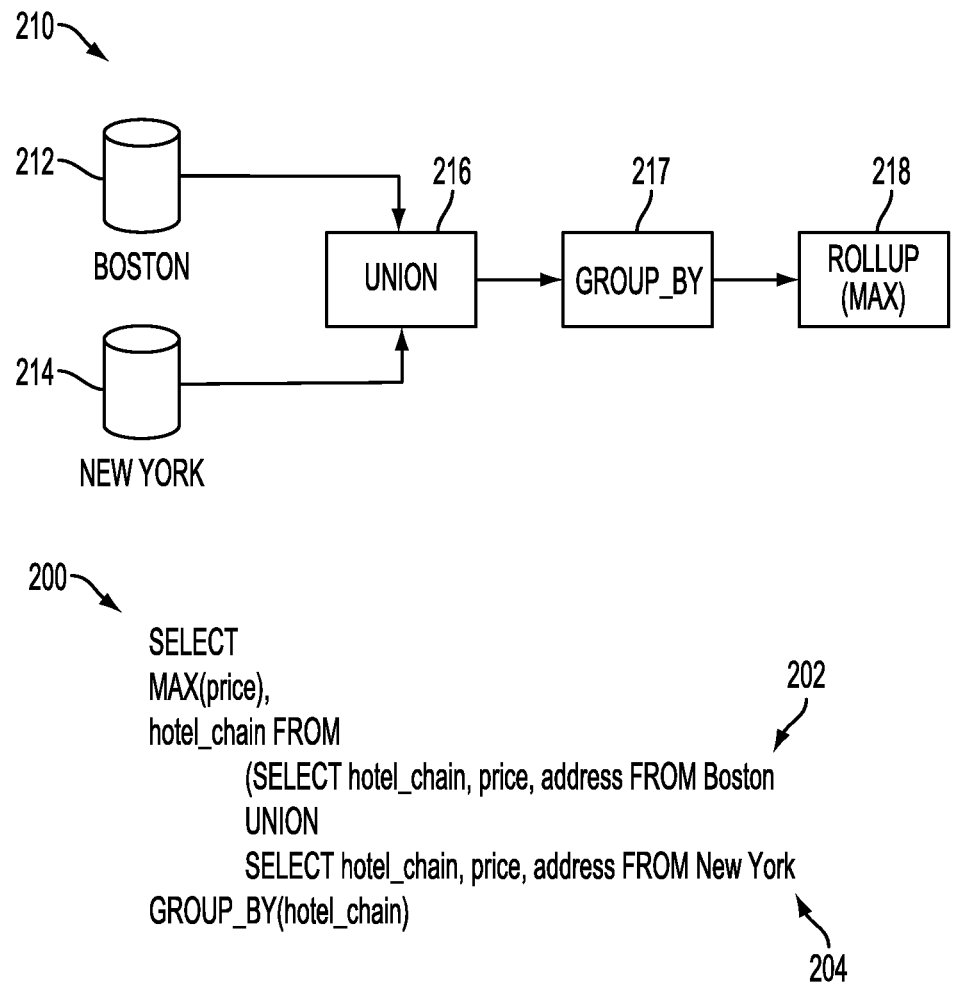
FIGS. 3 and 4 show query plans.
Figure 4:
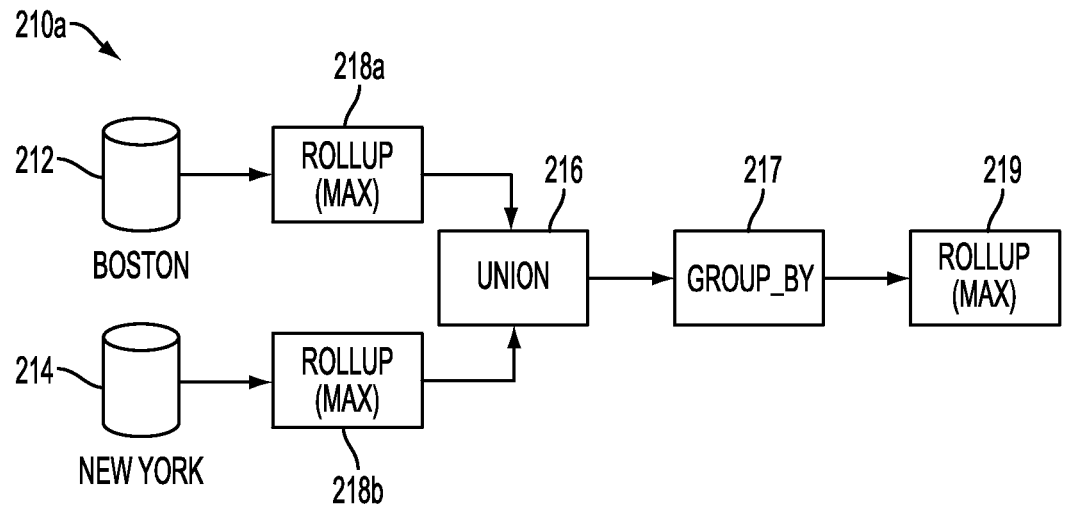

The aggregation operation 105 can be pushed down even if a union-type operation precedes the aggregation operation 105 in the query 102, which is shown in detail in FIGS. 3 and 4.

Figure 2:
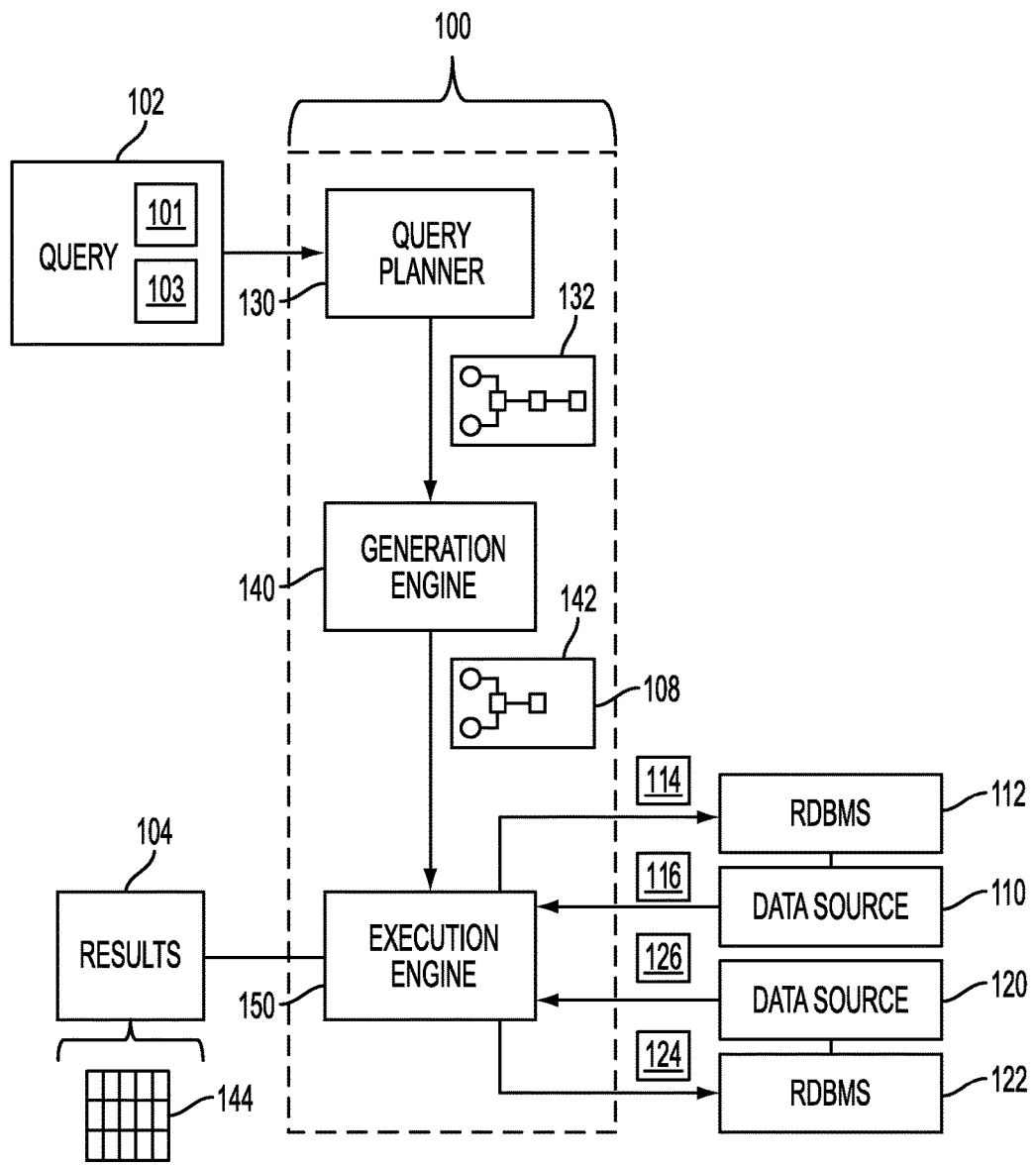
FIG. 2 shows elements of the data processing system.

FIG. 2 shows elements of the data processing system 100 that can be used to interpret a query 102 and generate a computer program 108 corresponding to the query 102.

The query 102 is received by a query planner 130 which generates a query plan 132 corresponding to the query 102. For example, the data processing system 100 can provide the query 102 to the query planner 130. A query plan is a description of operations (e.g., data processing operations) that may be performed if the query is executed. For example, the operations may be database operations, e.g., carried out by a database management system. The operations could also take other forms. Database operations are sometimes referred to as database functions or database tasks.

The query plan may describe one possible arrangement of operations, even if other arrangements of the operations or a different set of operations would accomplish the same result. A query planner is a system that can generate a query plan based on information about a query and information about data sources used by the query.

In some arrangements, operations may be executed in various orders while still providing equivalent outputs. As such, the query planner may have functionality that determines an optimal query plan. For example, an optimal query plan could be the query plan that describes the arrangement of operations for executing the query in the least amount of time, or using the least amount of database resources such as data storage space, or otherwise accomplishing the query within constraints that have been identified by the database system. The query planner's functionality for determining an optimal query plan may include functionality that scores or ranks many possible query plans, and may also include functionality that rearranges possible query plans to an optimal or efficient configuration.

A single query can be executed multiple times, and each execution could have a unique optimal query plan. For example, the data within a database table could change between two executions of a query. In this example, the operations described in the query plan that was generated for the first execution of the query may need more or less execution time during the second execution of the query than during the first execution. In this case, a different arrangement of operations may be better suited to the second execution of the query, for example, a different arrangement of the same operations, or an arrangement of different operations. A query plan optimized for the second execution of the query can be generated for that execution, taking into account the momentary state of the database table.

The query plan 132 is received by a computer program generation engine 140. The computer program generation engine 140 generates a computer program 108 that, when executed, carries out operations corresponding to the query 102. For example, the query 102 contains one or more operations defined by the structured query language and arguments associated with the operations. In this example, the computer program 108 contains executable functionality that is equivalent to the operations of the SQL query, and, when the computer program 108 is executed, the computer program 108 executes based on the same arguments.

The computer program generation engine 140 analyzes the query plan 132 to determine whether the operations represented by the query plan 132 should be changed before the computer program 108 is generated. Because the computer program 108 is generated based on the query plan 132, the computer program generation engine 140 can use the results of the analysis to modify the query plan 132 before proceeding with the generation of the computer program 108. For example, the query plan 132 may include a union-type operation followed by an aggregation operation. If so, the computer program generation engine 140 can modify the query plan 132 to place the aggregation operation before the union-type operation. This is shown in further detail in FIGS. 3 and 4.

When the computer program generation engine 140 generates the computer program, the computer program generation engine 140 can identify the aggregation operations as candidates for push-down to the data sources because they are performed on data received directly from the data sources (e.g., the data is not subject to any operations before the aggregation operation). The computer program generation engine 140 can then determine if either or both of the systems 112, 122 managing the data sources 110, 120 are capable of performing an operation equivalent to the aggregation operation. If the first system 112 is capable of performing an operation equivalent to the aggregation operation, the computer program generation engine 140 configures the computer program 108 to transmit instructions 114 to the first system 112 instructing the first system 112 to perform the operation equivalent to the aggregation operation and return summary data to the computer program. If the second system 122 is capable of performing an operation equivalent to the aggregation operation, the computer program generation engine 140 configures the computer program 108 to transmit instructions 124 to the second system 122 instructing the second system 122 to perform the operation equivalent to the aggregation operation and return summary data to the computer program.

In some implementations, the computer program 108 includes a dataflow graph 142. A dataflow graph is a computer program that contains components representing operations to be performed on input data and links between the components (sometimes called nodes) representing flows of data. The operations represented by the components generate output data based on the input data by processing the input data. A component can provide input data to and receive output data from other components if the component is linked to the other components, in which each link between two components represents a flow of data from one of the components to the other component. A subset of components of a graph (e.g., one or more components of the graph) is sometimes referred to as a subgraph of the graph. When the dataflow graph is executed by a graph-based processing system, each of the components is executed, e.g., a computer program or portion of a computer program is executed and carries out the operation represented by the component. During execution the dataflow graph receives input data which is processed (e.g., operated on by the operations of the dataflow graph's components) to generate output data. In some examples, some or all components of a dataflow graph are each associated with information for invoking executable program code to perform the operation associated with the component. For example, a component may be associated with a reference to a computer program stored in computer-readable storage containing computer-executable instructions for carrying out the operation associated with the component, e.g., processing and outputting data. In some examples, some or all components of a dataflow graph are each associated with information for making data available to the program code. For example, a component may be associated with function calls that can be invoked to deliver data to the executable program associated with the component, or the component may be associated with network ports that can receive data that is delivered to the executable program associated with the component, or the component may be associated with another technique for delivering data to the executable program associated with the component. In this way, each component can receive, process, and output data.

One example of a graph-based system is described in detail in U.S. Publication No. 2007/0011668, titled "Managing Parameters for Graph-Based Applications," incorporated herein by reference. A system for executing graph-based computations is described in U.S. Pat. No. 5,966,072, titled "Executing Computations Expressed as Graphs," incorporated herein by reference. Further, components of a dataflow graph can be substituted for operations of a query 102. Techniques in accordance with this substitution are further described in U.S. Publication No. 2011/0179014A1, titled "Managing Data Queries," and U.S. Publication No. 2012/0284255A1, also titled "Managing Data Queries," incorporated herein by reference. In some implementations, a dataflow graph can be produced from a query 102.

In some implementations, the computer program 108 can be configured with parameters. For example, the parameters may be values that can be changed to change the behavior of the program. As a specific example, a parameter may be "filename" and the value of the parameter could be the location of a file in a file system. The value of the parameter can be changed to a location of a different file to configure the program to access the different file. Two instances of the same program can be configured with different parameter values, which will change the behavior of the two instances of the same program.

An execution engine 150 receives the computer program 108. The execution engine 150 then executes the computer program 108, e.g., carries out instructions specified by program code associated with the computer program 108. When executed, the computer program 108 generates instructions 114, 124 and transmits the instructions 114, 124 to the systems 112, 122 managing the data sources 110, 120.

In some implementations, for example, if the computer program 108 is a dataflow graph, the execution engine 150 includes a specialized operating system, sometimes called a graph operating system. A graph operating system is a computer program capable of executing the operations underlying individual components of a dataflow graph. For example, if a component of a dataflow graph represents an operation to be carried out by a data processing system, the graph operating system is tasked with instructing a data processing system to carry out the operation.

After sending the instructions 114, 124 to the systems 112, 122 managing the data sources 110, 120, the computer program 108 receives summary data 116, 126 from the data sources 110, 120. The execution engine 150 then uses the summary data 116, 126 in the execution of the computer program 108 to produce results 104 of the query 102. In this way, the data processing system 100 can execute the query 102 to generate results 104 specified by the query.

FIG. 3 shows a query 200 written in SQL and a pictorial representation of a query plan 210 representing the query. For example, the query 200 could be an example of the query 102 shown in FIGS. 1 and 2, and the query plan 210 could be an example of the query plan 132 shown in FIG. 2. The query 200 is used to calculate the maximum value of a column called "price" found in two data sources (e.g., relational database tables) called "Boston" and "New York." The two data sources are identified by arguments 202, 204 in the query 200. The query 200 also calls for an operation called "GROUP BY hotel_chain" to be performed, which groups the data of the output according to one of the columns of the output, which here is the hotel_chain column. As a real-world example, this query could be used to obtain the maximum ("max") price of hotel rooms recorded in both a Boston database of hotels and a New York database of hotels. When the query is executed, the data from the two data sources is unioned (e.g., combined) and grouped by hotel chain. Then, the maximum price of a hotel room for each hotel chain is identified and returned.

The query plan 210 includes an identification of the two data sources 212, 214, which each provide data that are combined by a union-type operation 216. For example, the union-type operation 216 could be equivalent to "union" or "union all," depending, for example, on the operation specified in the SQL query 200. Here, the "union" operation (e.g, the UNION command) is specified in the SQL query 200.

The output of the union-type operation 216 is provided to a GROUP BY operation 217 which processes the data, e.g., by grouping the data by the hotel_chain column. The processed data is passed to a rollup operation 218 which determines the maximum value of the input data. The maximum value is the result of the query 200.

FIG. 4 shows another version of the query plan 210a. This version of the query plan 210a has been modified, e.g., modified by the computer program generation engine 140 shown in FIG. 2. (In some examples, the modification is performed in the query planner 130 before the query plan 132 is provided to the generation engine 140). In this version of the query plan 210a, a rollup operation 218a has been placed between the first data source 212 and the union-type operation 216, and another rollup operation 218b has been placed between the second data source 214 and the union-type operation 216. This arrangement of the query plan 210a will produce the same output as the query plan 210 in the arrangement shown in FIG. 3. Further, if either data source data source 212, 214 is capable of carrying out an operation equivalent to the rollup operation 218a, 218b, then the respective rollup operation 218a, 218b can be pushed down to the corresponding data source 212, 214.

This version of the query plan 210a includes an additional rollup operation 219 after the union-type operation. Because the rollup operations 218a, 218b each represent a "max" (maximum) operation, the maximum of the union-type operation output must be determined to identify the maximum value between the two values output by the union-type operation (e.g., the two values returned by the rollup operations 218a, 218b). Thus, a rollup operation 219 operates on the output of the union-type operation 216 and GROUP BY operation 217, just as a rollup operation 218 operates on the output of the union-type operation 216 and GROUP BY operation 217 shown in FIG. 3. However, this rollup operation 219 shown in FIG. 4 operates in a very small amount of data relative to the rollup operation 218 in this position shown in FIG. 3.

The query plan 210a shown in FIG. 4 can be generated based on properties of aggregation operations. For example, the following are some properties of aggregation operations, including MIN (minimum data value), MAX (maximum data value), SUM (summation of data values), COUNT (number of records), and AVG (average of data values). Each of these properties represents an expression that includes an aggregation operation, and an equivalent expression that includes multiple aggregation operations performed in a sequence. Some of these properties include an application of a distributive property, in which, given a function f, the expression f(X, Y) is equivalent to the expression f(f(X), f(Y)). In general, an aggregation operation can be converted to a sequence of aggregation operations according to these properties, and then some of the operations of the sequence can be "pushed down" to a system that manages a data source.

Property 1: AGG(X UNION ALL Y)=AGG(AGG(X) UNION ALL AGG(Y)) [where AGG is one of MIN, MAX, or SUM]

Property 2: COUNT(X UNION ALL Y)=SUM(COUNT (X) UNION ALL COUNT (Y))

Property 3: AVG(X UNION ALL Y)=SUM(X UNION ALL Y)/COUNT(X UNION ALL Y)=SUM(SUM(X) UNION ALL SUM(Y))/SUM(COUNT(X) UNION ALL COUNT(Y))

Property 4: AGG(X UNION Y)=AGG(AGG(X) UNION AGG(Y)) [where AGG is one of MIN or MAX]

The following pseudocode represents a technique for modifying a query plan to push down one or more aggregation operations each following a union-type operation.

Given a query plan with a range table of scopes and subqueries, where each subquery defines a target list of target entry expressions:

Traverse each subquery in the query plan starting from the top level.

For each subquery perform the following checks and transformations:
  Check if query has just one range table of subquery type with non-empty union parameter. Go to the next subquery if not.
  For each target entry in query target list:
    Check if target entry has an aggregate command. Go to the next target entry if not.
    Check if (aggregate command in (SUM, COUNT, AVG) and UNION ALL) or (aggregate command in (MIN, MAX) and UNION). Go to the next subquery if not.
  Transform subquery in query range table.
    For each range table in subquery:
      Create new subquery and copy range table to the new subquery's range table list.
      Copy query target list and group clause to the new subquery's target list and group clause.
      Check if target list has AVG function. Add SUM( ) and COUNT( ) functions for each AVG( ) function to the target list if so.
      Replace range table with new subquery.
  For each target entry in query target list:
    Check if target list has AVG function. Replace each AVG( ) function with corresponding newly formed SUM( )/COUNT( ).

Figure 5:
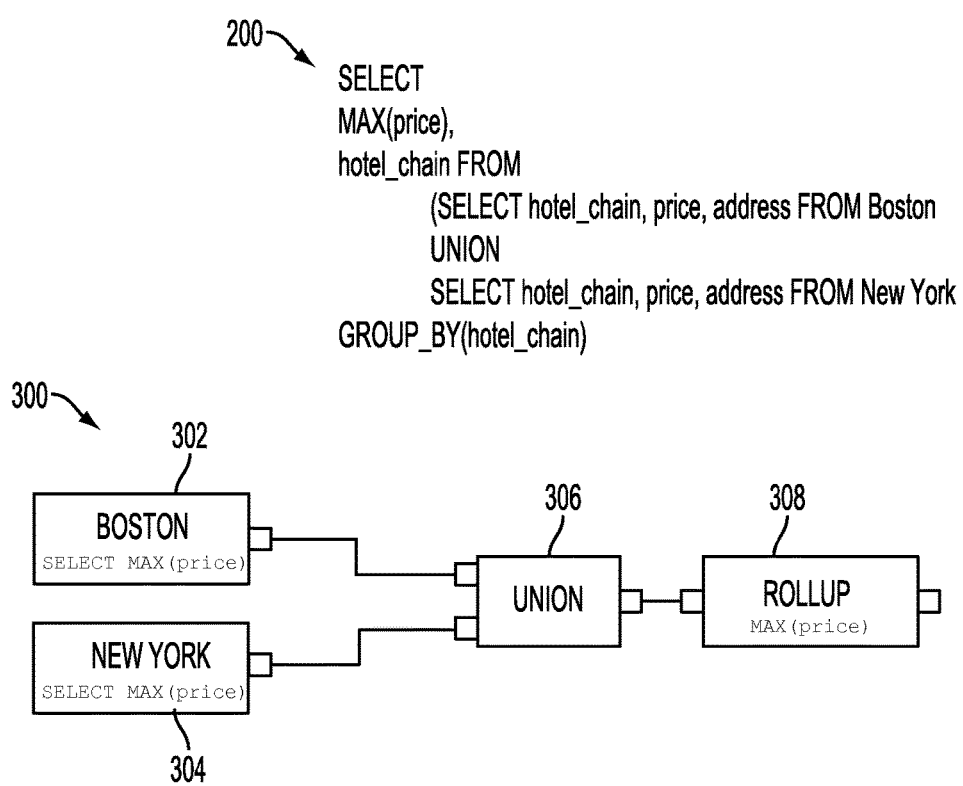
FIGS. 5 and 6 show computer programs.

FIG. 5 shows a computer program 300 generated from the query plan 210a. This computer program 300 could be an example of the computer program 108 shown in FIGS. 1 and 2. This computer program 300 is a dataflow graph containing components connected by links representing flows of data, and could also be an example of a dataflow graph 132 as shown in FIG. 2.

The computer program 300 has components representing executable code (e.g., one or more executable operations). The computer program 300 has a component 302 representing output data of the first data source 212 and a component 304 representing output data of the second data source 214. The two components 302, 304 are linked to a component 306 representing the union-type operation 216. In some implementations, the component 306 can be a combination of multiple components, e.g., a subgraph. This component 306 is linked to a component 308 together representing the rollup operation 219 and the GROUP BY operation 217. When the computer program 300 executes, the output of the computer program 300 is equivalent to the output of a system that executes the query 200 written in SQL shown in FIG. 3.

Each of the components 302, 304 representing output data of data sources has been configured to transmit instructions to their corresponding data sources. For example, the component 302 representing output data of the Boston data source 212 has been configured with instructions which, when transmitted to a system managing the Boston data source 212 (e.g., a system managing the data sets stored at the Boston data source 212), performs an operation equivalent to a summarization operation represented by the rollup operation 218a shown in FIG. 4. The operation is carried out before any data is received by the computer program 300. In some implementations, the component 302 may transmit a SQL query to the system managing the Boston data source 212. Here, the SQL query may specify a maximum of the "price" column of a database table stored at the Boston data source 212. The instructions could be a SQL statement, e.g. "SELECT max(price), hotel_chain FROM Boston GROUP BY hotel_chain". In this way, the rollup operation 218a has been pushed down to the Boston data source 212.

In this example, the aggregation operations have been pushed down to both the Boston data source 212 and the New York data source 214. Thus, the systems managing the Boston data source 212 and the New York data source 214 have been determined to be capable of performing an operation equivalent to the aggregation operation. In some implementations, this determination is made by the computer program generation engine 140 shown in FIG. 2, and the computer program generation engine 140 uses this determination when generating the computer program 300. In some implementations, this determination is made by the query planner 130 shown in FIG. 2, and the query plan 132 is modified by the query planner 130 to incorporate the push-down of the aggregation operations. In these implementations, the computer program generation engine 140 can generate the computer program 300 from the query plan 132 and does not need to evaluate the capabilities of the systems managing the data sources identified in the query plan 132.

Figure 6:
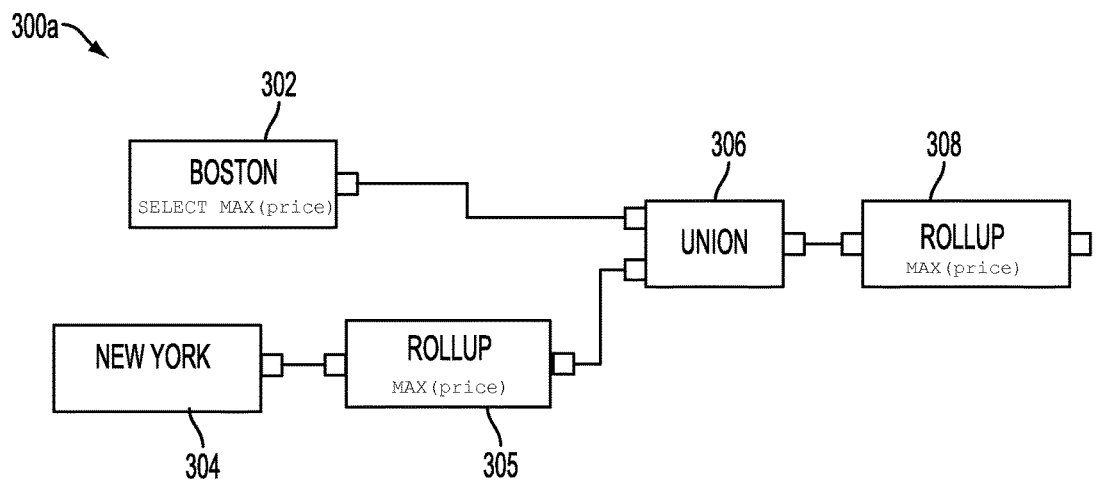

In some examples, at least one of the data sources may not be capable of performing an operation equivalent to the aggregation operation. FIG. 6 shows an example of a computer program 300a generated from the query plan 210a. In this example, system managing the Boston data source 212 has been determined to be capable of performing an operation equivalent to the aggregation operation. However, the system managing the New York data source 214 has been determined to be incapable of performing an operation equivalent to the aggregation operation. Thus, in this computer program 300a, the component 304 representing the output of the New York data source 214 is linked to a rollup component 305, which is linked to the component 306 representing the union-type operation. Here, because the MAX operation cannot be pushed down to the New York data source 214, the operation is instead performed at the rollup component 305. The component 302 representing the output of the Boston data source 214 is configured to send instructions to the Boston data source 214 to carry out an operation equivalent to the aggregation operation 218a from the query plan 210, and so the component 302 representing the output of the Boston data source 214 is linked to the component 306 representing the union-type operation. In this way, an aggregation operation can be pushed down to some data sources even if other data sources do not support the operation.

Figure 7:
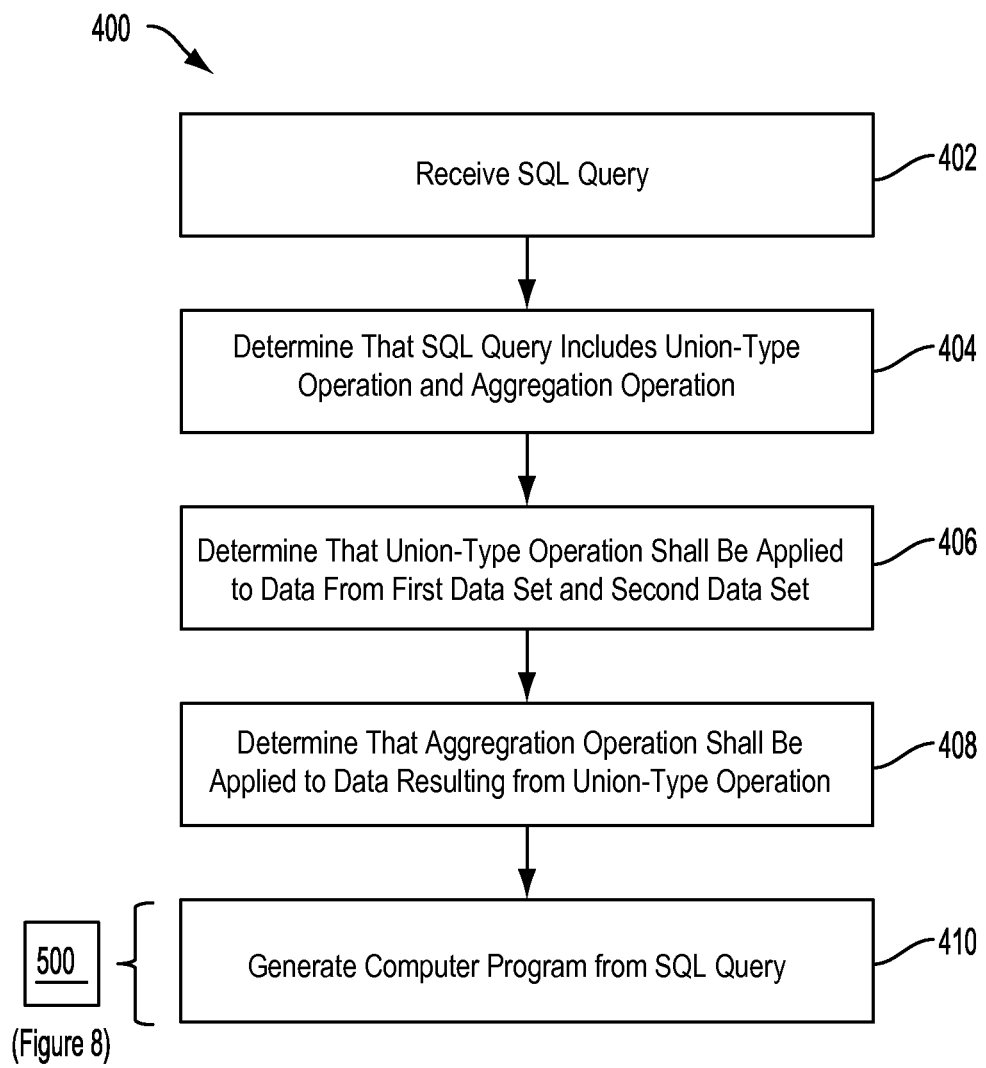
FIGS. 7 and 8 are flowcharts.

FIG. 7 shows a flowchart representing a procedure 400 for generating a computer program based on an SQL query. The procedure 400 can be carried out, for example, by components of the data processing system 100 shown in FIG. 1.

The procedure receives 402 a SQL query. For example, the SQL query can be an example of the query 102 shown in FIG. 1. In some examples, the SQL query includes references to one or more data sets that are external to the data processing system. For example, the query could have a reference to a first data set stored at a first data source, and a reference to a second data set stored at a second data source different from the first data source. For example, the data sources could be relational databases (e.g., storing relational database tables), flat files accessible on data storage, data streams accessible via a network, HDFS (Hadoop Distributed File System) files, or other kinds of data sources. The data sources 110, 120 shown in FIG. 1 are examples of data sources, and the data sets could be data stored at the data sources 110, 120. Examples of references are the arguments 202, 204 shown in FIG. 3.

The procedure determines 404 that the SQL query includes two or more commands, the commands including a first union-type operation and a first aggregation operation. In some implementations, the union-type operation is applied to a first portion of data based on data received from a first data source, and also is applied to a second portion of data based on data received from a second data source. An example of the SQL query is the SQL query 200 shown in FIG. 3. In some implementations, the SQL query is determined to include the union-type operation and the first aggregation operation based on a query plan generated from the SQL query.

The procedure determines 406 that the SQL query describes that the first union-type operation shall be applied to at least a portion of data from the first data set, and applied to at least a portion of data from the second data set. For example, the process could parse the SQL query to identify the union-type operation (e.g., UNION or UNION ALL) and identify arguments corresponding to the portions of data (e.g., arguments specifying data sources containing the portions of data).

The procedure determines 408 that the SQL query describes that the first aggregation operation shall be applied to data resulting from the first union-type operation. For example, the procedure could parse the SQL query to identify the first aggregation operation and, for example, that the union-type operation is provided as an argument to the first aggregation operation.

In some implementations, the procedure determines a second aggregation operation based on the first aggregation operation. For example, the procedure may determine a sequence of operations that, when carried out, produces output equivalent to output of the first aggregation operation, and selects the second aggregation operation from the sequence of operations. As one example, the first aggregation operation could be a minimum, maximum, sum, or count operation, and the second aggregation operation could be of the same type of aggregation operation as the first aggregation operation. As another example, the first aggregation operation could be an average operation, and the second aggregation operation could be a sum operation or a count operation. In these examples, the second aggregation operation is selected according to one of Properties 1-4 described above.

In some implementations, the procedure determines that the second aggregation operation can be performed by a system that manages the first data source. For example, if the system that manages the data source is an RDBMS that can execute SQL statements, then the system can perform the aggregation operation if the operation is represented as part of a SQL statement. Examples of an RDBMS 112, 122 are shown in FIG. 1.

The procedure generates 410 a computer program based on the SQL query. In some implementations, the computer program is generated by a first system, e.g., the data processing system 100 shown in FIG. 1. The execution of the program may correspond to the procedure 500 shown in FIG. 8 below. In some implementations, this includes generating a query plan based on the SQL query; adding, to the query plan, a second aggregation operation which is applied to data from the first data source; determining that a first system associated with the first data source includes the functionality for carrying out the second aggregation operation; appending, to a portion of the query plan representing the first data source, instructions to carry out the second aggregation operation; and generating the computer program based on the query plan. The program can then be executed.

In some implementations, the computer program generated 410 in the procedure 400 includes a first component representing the union-type operation of the SQL query. The first component is applied to a summary of the first portion of data and a summary of the second portion of data, where the summaries each contain fewer records than their respective corresponding portions of data. The computer program can also include a second component representing the first data source, where the second component, when executed, causes the instructions to be transmitted for execution by the first system. The instructions may include a SQL statement that includes a command corresponding to the second aggregation operation. Further, the instructions are carried out before the first system causes data to be transmitted to a system executing the computer program.

In this example, the output of the second component may include the summary of the first portion of data from the first data source. The computer program may also include a third component representing the second data source, and a fourth component representing a third aggregation operation, where the output of the third component flows to the fourth component, and the output of the fourth component flows to the first component. For example, the third aggregation operation could be represented by the component 305 shown in FIG. 6. Further, the output of the first component may flow to another aggregation operation, e.g., as represented by the component 308 shown in FIG. 6.

In some implementations, the computer program also transmits instructions that direct a third system to perform a second aggregation operation on a portion of data from the second data set, and receives, from the third system, a particular data set that is the summary of the second portion of data. This may occur, for example, when a determination is made that the system managing the second data source can perform the second aggregation operation.

Figure 8:
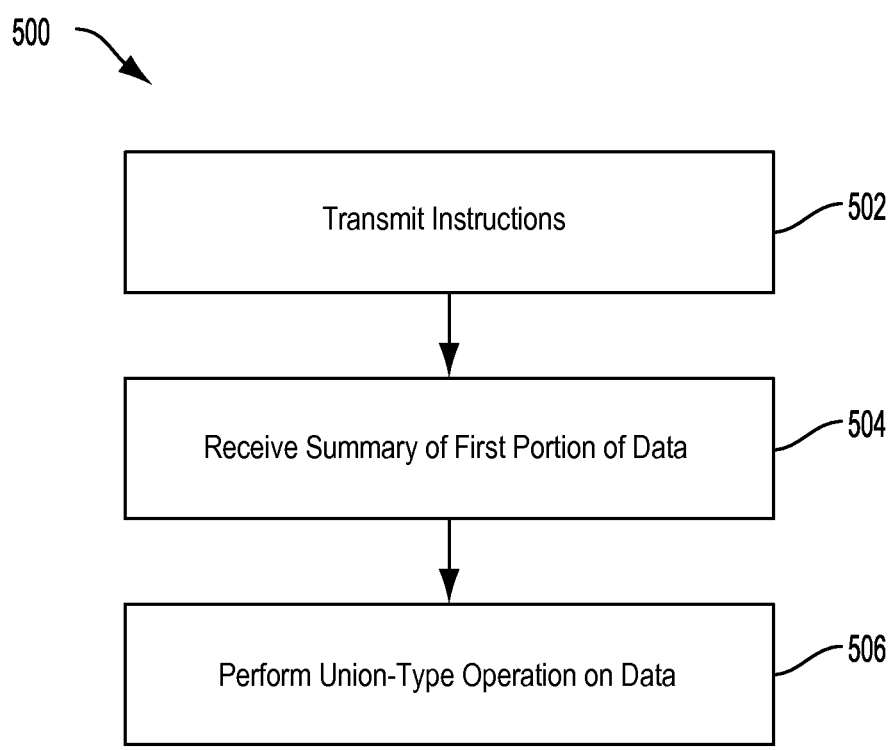

FIG. 8 shows a flowchart representing a procedure 500 for executing operations in connection with executing a SQL query. The procedure 500 can be carried out, for example, by a first system, such as components of the data processing system 100 shown in FIG. 1. For example, the procedure 500 can be carried out by the execution engine 150 shown in FIG. 2 when the execution engine 150 executes at least part of a computer program generated from a SQL query. The computer program could be the computer program 108 shown in FIGS. 1-2 and the computer program generated 410 in FIG. 7. Further, the SQL query could be the query 102 shown in FIGS. 1 and 2.

The procedure transmits 502 instructions that direct a second system to perform a second aggregation operation on a portion of data from the first data set. For example, the second system can be one of the systems 112, 122 shown in FIG. 1. The instructions can be in the form of a SQL statement. For example, the instructions can be the instructions 114, 124 shown in FIG. 1.

The procedure receives 504, from the second system, a particular data set that is a summary of the first portion of data. For example, the portion of data can be a portion of data referenced in the SQL query from which the computer program was generated.

The procedure 506 performs a second union-type operation on the particular data set and a summary of a portion of data from the second data set. For example, the second portion of data can be another portion of data referenced in the SQL query from which the computer program was generated. In some implementations, the second union-type operation is of the same type as the first union-type operation. As described above, one type of union-type operation is "union" and another is "union all." For example, if the first union-type operation is a "union all" operation, and the second union-type operation is also a "union all" operation, then the two operations are of the same type.

In this way, the computer program produces output equivalent to output of the SQL query, e.g., as if the SQL query were processed by a relational database system or other system that evaluates (e.g., executes) SQL queries. However, because operations are "pushed down" to data sources, the computer program may operate more efficiently than if the operations were carried out by the computer program itself.

The query planner 130, generation engine 140, and/or execution engine 150 shown in FIG. 2 may be hosted, for example, on one or more general-purpose computers under the control of a suitable operating system, such as a version of the UNIX operating system. For example, this can include a multiple-node parallel computing environment including a configuration of computer systems using multiple central processing units (CPUs) or processor cores, either local (e.g., multiprocessor systems such as symmetric multi-processing (SMP) computers), or locally distributed (e.g., multiple processors coupled as clusters or massively parallel processing (MPP) systems, or remote, or remotely distributed (e.g., multiple processors coupled via a local area network (LAN) and/or wide-area network (WAN)), or any combination thereof.

The computer programs 300, 300a shown in FIGS. 5 and 6 may be displayed in a development environment. The development environment is, in some implementations, a system for developing applications as dataflow graphs. Dataflow graphs made in accordance with this system provide methods for getting information into and out of individual processes represented by graph components, for moving information between the processes, and for defining a running order for the processes. This system includes algorithms that choose interprocess communication methods from any available methods (for example, communication paths according to the links of the graph can use TCP/IP or UNIX domain sockets, or use shared memory to pass data between the processes).

The techniques described above can be implemented using a computing system executing suitable software. For example, the software may include procedures in one or more computer programs that execute on one or more programmed or programmable computing system (which may be of various architectures such as distributed, client/server, or grid) each including at least one processor, at least one data storage system (including volatile and/or non-volatile memory and/or storage elements), at least one user interface (for receiving input using at least one input device or port, and for providing output using at least one output device or port). The software may include one or more modules of a larger program, for example, that provides services related to the design, configuration, and execution of dataflow graphs. The modules of the program (e.g., elements of a dataflow graph) can be implemented as data structures or other organized data conforming to a data model stored in a data repository.

The software may be provided on a tangible, non-transitory medium, such as a CD-ROM or other computer-readable medium (e.g., readable by a general or special purpose computing system or device), or delivered (e.g., encoded in a propagated signal) over a communication medium of a network to a tangible, non-transitory medium of a computing system where it is executed. Some or all of the processing may be performed on a special purpose computer, or using special-purpose hardware, such as coprocessors or field-programmable gate arrays (FPGAs) or dedicated, application-specific integrated circuits (ASICs). The processing may be implemented in a distributed manner in which different parts of the computation specified by the software are performed by different computing elements. Each such computer program is preferably stored on or downloaded to a computer-readable storage medium (e.g., solid state memory or media, or magnetic or optical media) of a storage device accessible by a general or special purpose programmable computer, for configuring and operating the computer when the storage device medium is read by the computer to perform the processing described herein. The inventive system may also be considered to be implemented as a tangible, non-transitory medium, configured with a computer program, where the medium so configured causes a computer to operate in a specific and predefined manner to perform one or more of the processing steps described herein.

A number of embodiments of the invention have been described. Nevertheless, is to be understood that the foregoing description is intended to illustrate and not to limit the scope of the invention, which is defined by the scope of the following claims. Accordingly, other embodiments are also within the scope of the following claims. For example, various modifications may be made without departing from the scope of the invention. Additionally, some of the steps described above may be order independent, and thus can be performed in an order different from that described.

What is claimed is:
1. A computer-implemented method of generating a computer program based on an SQL query, including:
receiving a SQL query, including a reference to a first data set stored at a first data source, and including a reference to a second data set stored at a second data source different from the first data source;

determining that the SQL query includes two or more commands, the commands including a first union-type operation, and a first aggregation operation, and determining that the SQL query describes that the first union-type operation shall be applied to at least a portion of data from the first data set, and applied to at least a portion of data from the second data set;

determining that the SQL query describes that the first aggregation operation shall be applied to data resulting from the first union-type operation;

generating, on a first system, a computer program based on the SQL query, the generating including generating at least a first module of the computer program representing a second system, the first module configured for:

transmitting instructions that direct a second system to perform a second aggregation operation on a portion of data from the first data set, and receiving, from the second system, a particular data set that is a summary of the portion of data from the first data set; and generating at least a second module of the computer program configured for:

receiving output originating from the first module, and performing a second union-type operation on the particular data set and a summary of a portion of data from the second data set.

2. The method of claim 1 in which the first system includes a graph-based processing system, and the second system includes a relational database management system.

3. The method of claim 1 in which the computer program is further configured for:

transmitting instructions that direct a third system to perform a second aggregation operation on a portion of data from the second data set; and receiving, from the third system, a particular data set that is the summary of the portion of data from the second data set.

4. The method of claim 1 in which the computer program includes:

a first component representing the union-type operation of the SQL query that is applied to the data sets that are the summary of the portion of data from the first data set and the summary of the portion of data from the second data set, where the summaries each contain fewer records than their respective corresponding portions of data, and a second component representing the first data set, where the second component, when executed, causes the instructions to be transmitted.

5. The method of claim 4, the computer program including a third component representing the second data set, and a fourth component representing a third aggregation operation, where output of the third component flows to the fourth component, and output of the fourth component flows to the first component.

6. The method of claim 4 in which the output of the second component includes the particular data set that is the summary of the portion of data from the first data set.

7. The method of claim 4 in which the component representing the first data source transmits the instructions, wherein the instructions are carried out before the first system causes data to be transmitted to a system executing the computer program.

8. The method of claim 1 in which the instructions include a SQL statement that includes a command corresponding to the second aggregation operation.

9. The method of claim 1 in which generating the computer program based on the SQL query includes generating a query plan based on the SQL query;

adding, to the query plan, the second aggregation operation that is applied to data from the first data source;

determining that the first system includes functionality for carrying out the second aggregation operation;

appending, to a portion of the query plan representing the first data set, instructions to carry out the second aggregation operation; and generating the computer program based on the query plan.

10. The method of claim 1 in which the first aggregation operation is a minimum, maximum, sum, or count operation, and the second aggregation operation is of the same type of aggregation operation as the first aggregation operation.

11. The method of claim 1 in which the first aggregation operation is an average operation, and the second aggregation operation is a sum operation or a count operation.

12. The method of claim 1, including determining the second aggregation operation based on first aggregation operation.

13. The method of claim 12 in which determining the second aggregation operation based on first aggregation operation includes determining a sequence of operations that, when carried out, produces output equivalent to output of the first aggregation operation, and selecting the second aggregation operation from the sequence of operations.

14. The method of claim 1 in which the first union-type operation is of the same type to the second union-type operation.

15. The method of claim 1, wherein generating the first module includes configuring parameters of the first module, the parameters being values that affect the behavior of the modules of the generated computer program.

16. A system for generating a computer program based on an SQL query, including:

one or more processors configured for:

receiving a SQL query, including a reference to a first data set stored at a first data source, and including a reference to a second data set stored at a second data source different from the first data source;

determining that the SQL query includes two or more commands, the commands including a first union-type operation, and a first aggregation operation, and determining that the SQL query describes that the first union-type operation shall be applied to at least a portion of data from the first data set, and applied to at least a portion of data from the second data set;

determining that the SQL query describes that the first aggregation operation shall be applied to data resulting from the first union-type operation;

generating, on a first system, a computer program based on the SQL query, the generating including generating at least a first module of the computer program representing a second system, the first module configured for:

transmitting instructions that direct a second system to perform a second aggregation operation on a portion of data from the first data set, and receiving, from the second system, a particular data set that is a summary of the portion of data from the first data set; and generating at least a second module of the computer
   program configured for:
   receiving output originating from the first module, and
   performing a second union-type operation on the particular data set and a summary of a portion of data from the second data set.

17. The system of claim 16 in which the computer program is further configured for:
   transmitting instructions that direct a third system to perform a second aggregation operation on a portion of data from the second data set; and
   receiving, from the third system, a particular data set that is the summary of the portion of data from the second data set.

18. The system of claim 16 in which the computer program includes:
   a first component representing the union-type operation of the SQL query that is applied to the data sets that are the summary of the portion of data from the first data set and the summary of the portion of data from the second data set, where the summaries each contain fewer records than their respective corresponding portions of data, and
   a second component representing the first data set, where the second component, when executed, causes the instructions to be transmitted.

19. The system of claim 18, in which the computer program includes
   a third component representing the second data set, and a fourth component representing a third aggregation operation, where output of the third component flows to the fourth component, and output of the fourth component flows to the first component.

20. The system of claim 18 in which the output of the second component includes the particular data set that is the summary of the portion of data from the first data set.

21. The system of claim 18 in which the component representing the first data source transmits the instructions, wherein the instructions are carried out before the first system causes data to be transmitted to a system executing the computer program.

22. The system of claim 16 in which the instructions include a SQL statement that includes a command corresponding to the second aggregation operation.

23. The system of claim 16 in which generating the computer program based on the SQL query includes
   generating a query plan based on the SQL query;
   adding, to the query plan, the second aggregation operation that is applied to data from the first data source;
   determining that the first system includes functionality for carrying out the second aggregation operation;
   appending, to a portion of the query plan representing the first data set, instructions to carry out the second aggregation operation; and
   generating the computer program based on the query plan.

24. The system of claim 16 in which the first aggregation operation is a minimum, maximum, sum, or count operation, and the second aggregation operation is of the same type of aggregation operation as the first aggregation operation.

25. The system of claim 16 in which the first aggregation operation is an average operation, and the second aggregation operation is a sum operation or a count operation.

26. The system of claim 16, the one or more processors configured for determining the second aggregation operation based on first aggregation operation.

27. The system of claim 26 in which determining the second aggregation operation based on first aggregation operation includes
   determining a sequence of operations that, when carried out, produces output equivalent to output of the first aggregation operation, and
   selecting the second aggregation operation from the sequence of operations.

28. The system of claim 16 in which the first union-type operation is of the same type to the second union-type operation.

29. The system of claim 16, in which generating the first module includes configuring parameters of the first module, the parameters being values that affect the behavior of the modules of the generated computer program.

30. A non-transitory computer-readable medium storing executable code that, when executed, causes a computer system to carry out operations for generating a computer program based on an SQL query, including:
   receiving a SQL query, including a reference to a first data set stored at a first data source, and including a reference to a second data set stored at a second data source different from the first data source;
   determining that the SQL query includes two or more commands, the commands including a first union-type operation, and a first aggregation operation, and
   determining that the SQL query describes that the first union-type operation shall be applied to at least a portion of data from the first data set, and applied to at least a portion of data from the second data set;
   determining that the SQL query describes that the first aggregation operation shall be applied to data resulting from the first union-type operation;
   generating, on a first system, a computer program based on the SQL query, the generating including
      generating at least a first module of the computer program representing a second system, the first module configured for:
         transmitting instructions that direct a second system to perform a second aggregation operation on a portion of data from the first data set, and
         receiving, from the second system, a particular data set that is a summary of the portion of data from the first data set; and
      generating at least a second module of the computer program configured for:
         receiving output originating from the first module, and
         performing a second union-type operation on the particular data set and a summary of a portion of data from the second data set.

31. The non-transitory computer-readable medium of claim 30 in which the computer program is further configured for:
   transmitting instructions that direct a third system to perform a second aggregation operation on a portion of data from the second data set; and
   receiving, from the third system, a particular data set that is the summary of the portion of data from the second data set.

32. The non-transitory computer-readable medium of claim 30 in which the computer program includes:
   a first component representing the union-type operation of the SQL query that is applied to the data sets that are the summary of the portion of data from the first data set and the summary of the portion of data from the second data set, where the summaries each contain fewer records than their respective corresponding portions of data, and a second component representing the first data set, where the second component, when executed, causes the instructions to be transmitted.

33. The non-transitory computer-readable medium of claim 32 in which the computer program includes
a third component representing the second data set, and a fourth component representing a third aggregation operation, where output of the third component flows to the fourth component, and output of the fourth component flows to the first component.

34. The non-transitory computer-readable medium of claim 32 in which the output of the second component includes the particular data set that is the summary of the portion of data from the first data set.

35. The non-transitory computer-readable medium of claim 32 in which the component representing the first data source transmits the instructions, wherein the instructions are carried out before the first system causes data to be transmitted to a system executing the computer program.

36. The non-transitory computer-readable medium of claim 30 in which the instructions include a SQL statement that includes a command corresponding to the second aggregation operation.

37. The non-transitory computer-readable medium of claim 30 in which generating the computer program based on the SQL query includes
generating a query plan based on the SQL query;
adding, to the query plan, the second aggregation operation that is applied to data from the first data source;
determining that the first system includes functionality for carrying out the second aggregation operation;
appending, to a portion of the query plan representing the first data set, instructions to carry out the second aggregation operation; and
generating the computer program based on the query plan.

38. The non-transitory computer-readable medium of claim 30 in which the first aggregation operation is a minimum, maximum, sum, or count operation, and the second aggregation operation is of the same type of aggregation operation as the first aggregation operation.

39. The non-transitory computer-readable medium of claim 30 in which the first aggregation operation is an average operation, and the second aggregation operation is a sum operation or a count operation.

40. The non-transitory computer-readable medium of claim 30, the operations including determining the second aggregation operation based on first aggregation operation.

41. The non-transitory computer-readable medium of claim 40 in which determining the second aggregation operation based on first aggregation operation includes
determining a sequence of operations that, when carried out, produces output equivalent to output of the first aggregation operation, and
selecting the second aggregation operation from the sequence of operations.

42. The non-transitory computer-readable medium of claim 30 in which the first union-type operation is of the same type to the second union-type operation.

43. The non-transitory computer-readable medium of claim 30, in which generating the first module includes configuring parameters of the first module, the parameters being values that affect the behavior of the modules of the generated computer program.

44. A system for generating a computer program based on an SQL query, including:
means for receiving a SQL query, including a reference to a first data set stored at a first data source, and including a reference to a second data set stored at a second data source different from the first data source;
means for determining that the SQL query includes two or more commands, the commands including a first union-type operation, and a first aggregation operation, and
means for determining that the SQL query describes that the first union-type operation shall be applied to at least a portion of data from the first data set, and applied to at least a portion of data from the second data set;
means for determining that the SQL query describes that the first aggregation operation shall be applied to data resulting from the first union-type operation;
means for generating, on a first system, a computer program based on the SQL query, the generating including
generating at least a first module of the computer program representing a second system, the first module configured for:
transmitting instructions that direct a second system to perform a second aggregation operation on a portion of data from the first data set, and
receiving, from the second system, a particular data set that is a summary of the portion of data from the first data set; and
generating at least a second module of the computer program configured for:
receiving output originating from the first module, and
performing a second union-type operation on the particular data set and a summary of a portion of data from the second data set.

* * * * *